United States Patent [19]

Heiskel et al.

[11] Patent Number: 4,647,395
[45] Date of Patent: Mar. 3, 1987

[54] PHONOGRAPH DISK CARE PRODUCT

[75] Inventors: Elmar Heiskel, Dreieich; Thomas Blank, Frankfurt am Main, both of Fed. Rep. of Germany

[73] Assignee: Hoechst Aktiengesellschaft, Fed. Rep. of Germany

[21] Appl. No.: 778,295

[22] Filed: Sep. 20, 1985

Related U.S. Application Data

[63] Continuation of Ser. No. 615,307, May 30, 1984, abandoned.

[30] Foreign Application Priority Data

Jun. 1, 1983 [DE] Fed. Rep. of Germany ....... 3319794

[51] Int. Cl.$^4$ ............................. C09K 3/16; G11B 3/58
[52] U.S. Cl. ............................... 252/174.21; 252/172; 252/174.22
[58] Field of Search ................... 252/174.21, 174.22, 252/172

[56] References Cited

U.S. PATENT DOCUMENTS

| | | | |
|---|---|---|---|
| 3,282,776 | 11/1966 | Kitzke et al. | 424/45 |
| 3,342,740 | 9/1967 | Kazmierczak et al. | 106/13 |
| 3,402,192 | 9/1968 | Haluska | 521/112 |
| 3,713,851 | 1/1973 | Cekada | 106/38.22 |
| 3,900,407 | 8/1975 | Kaufman | 252/8.57 |
| 4,125,668 | 11/1978 | Pardee | 428/409 |
| 4,269,739 | 5/1981 | Grejsner | 106/10 |

FOREIGN PATENT DOCUMENTS

| | | |
|---|---|---|
| 0008209 | 2/1980 | European Pat. Off. |
| 1074871 | 10/1954 | France |
| 1076920 | 7/1967 | United Kingdom |
| 1295611 | 11/1972 | United Kingdom |

OTHER PUBLICATIONS

"Informatiuon über Silikone in der Kosmetik", Dow Corning Europe, pamphlet 22-640-03, 4 pp., ©1980.
Abstract of U.S. Pat. No. 4,269,739 (counterpart of Europe No. EP 0 008 209, of record), from O. G.

Primary Examiner—A. Lionel Clingman
Attorney, Agent, or Firm—Connolly and Hutz

[57] ABSTRACT

A homogeneous wax-free single-phase liquid disk care agent contains a water-soluble silicone oil, in particular a siloxane-glycol copolymer. Preferably the liquid phase consists mainly of FKW 113.

14 Claims, No Drawings

PHONOGRAPH DISK CARE PRODUCT

This case is a continuation of copending application Ser. No. 615,307 filed May 30, 1984, now abandoned.

The invention relates to a liquid disk care product which contains a water-soluble silicone oil. The product combines the following four important properties with regard to care:

1. Conducting electrostatic charge away from the disk.
2. Easy removal of extraneous substances from the disk surface and from the disk grooves.
3. Anti-adhesive effect and hence reduction of further soiling of the disk.
4. Reduction of friction between the stylus and the disk groove.

Various systems for the treatment of disks are available on the market, and only the most important of these will be selected here. In the wet-play method, a brush which also runs over the disk is used to apply a liquid (for example an alcohol-water mixture) which conducts away electrostatic charge and dissolves or suspends the dirt present in the groove. A disadvantage is that, after the wet-play liquid has evaporated, the dirt is deposited more deeply and more firmly in the groove. Hence, dirt cannot be removed from the disk in this manner. Under certain circumstances, the alcohol present in the liquid may attack both the disk and the points of adhesion on the stylus holder.

Furthermore, attempts have already been made to conduct electrostatic charge away from the disk by placing sweeping brushes or carbon fibre brushes on the disk. The test reports available show that these means can sweep away only large bits of fluff and dust particles from the disk surface. When they are used, a high static charge is produced. The very fine dust therefore cannot be removed, but is only distributed in the disk groove. Furthermore, these means are incapable of removing soluble dirt.

Finally, attempts have also been made to clean the disks by applying liquids, generally in the form of sprays. Although many of the commercially available cleaning sprays are to a large extent suitable for removing dirt and dust, they cannot prevent the production of charge and the rapid further soiling associated with this.

French patent application No. 1,074,871 discloses an alcoholic solution or aqueous emulsion of an alkyl polysiloxane, which solution or emulsion is applied to disks as an antistatic liquid, for example by spraying on. However, the alkylpolysiloxanes employed have only a small antistatic action and furthermore maintain their effect for only a short time.

European Pat. No. 8,209 discloses a cleaning agent which can also be used for disks and which contains five particular components, namely a wax, a liquid silicone oil possessing lubricant activity, a surface-active polysiloxane copolymer, a fluorinated organic surface-active compound and a non-ionic surfactant. However, the high contents of wax and surfactants result in the disk becoming tacky and the stylus very soiled, particularly on repeated use. Other disadvantages are that the dirt has to be removed from the grooves with the aid of the stylus and the dirt which has not been removed is firmly stuck to the disk by the wax.

The object was therefore to find an agent which does not have these disadvantages and manages with concentrations of active ingredient which are as low as possible.

The present invention solves this problem.

A homogeneous, single-phase liquid, wax-free, non-aqueous disk care product containing silicone oil has now been found, wherein the silicone oil is water-soluble. The expression "non-aqueous" is intended to mean that, if necessary, small amounts of water (not more than 20% by weight) may be present in the agent. Aqueous emulsions of a water-insoluble silicone oil contain two mutually immiscible liquid phases and do not fall under this definition. The amount of the silicone oil should be such that, after the disk has been used, a very thin film remains behind. Contents of 0.0001 to 5% by weight, in particular 0.001 to 0.5%, preferably 0.01 to 0.1%, of the water-soluble silicone oil have proven useful. Particularly advantageous water-soluble silicone oils are siloxane-glycol block copolymers, since they have very pronounced anti-static properties. Silicone oil L03 from Wacker-Chemie GmbH, Munich, has proven useful.

The agent according to the invention furthermore contains volatile organic compounds as solvents, which, in the concentration in which they are present, must not however attack the PVC of the disk. For example, the agent can contain, in addition to silicone oil, large amounts (for example 40–95% by weight) of 1,1,2-trichloro-1,2,2-trifluoroethane (FKW 113).

The agent according to the invention can also contain substantial amounts of at least one aliphatic alcohol having 1 to 3 carbon atoms. The amount of aliphatic alcohol can be up to 96% by weight, more advantageously up to 80% by weight, preferably up to 60%, in particular up to 40%. Particularly preferably, the amounts of alcohol are up to 20%, in particular 5 to 20%, namely 10 to 20%. When large amounts of alcohol are present, dissolving of the PVC surface must be prevented, if necessary by the addition of water.

A particularly preferred aliphatic alcohol is ethanol.

A mixture of FKW 113 and an aliphatic alcohol can particularly advantageously be used as the solvent.

It is advantageous if the FKW 113/alcohol mixture also contains small amounts of water. A water content increases the evaporation time for a cleaning agent which contains FKW 113/alcohol as the solvent and is applied to the disk. Of course, the amount of water must not be so high that the presence of the water-immissible FKW 113 results in separation into two liquid phases. The amount of water in an agent according to the invention which contains an aliphatic alcohol is preferably not more than 10% by weight, in particular not more than 5%. The amount of water is preferably at least 0.3%, in particular 0.4 to 0.6%. It is preferable if the weight ratio water/alcohol is not more than 0.2. This ratio is preferably 0.01 to 0.1, in particular 0.2 to 0.06. In the case of ethanol, the low water contents of the commercial product (about 4 to 6% of water) are sufficient.

The cleaning liquid according to the invention can be applied to the disk directly from a liquid container. When the still moist disk is subsequently wiped with a felt or velvet cloth, the dirt is removed from the grooves. At the same time, a very thin film of the antistatic silicone oil is deposited on the disk surface. The water-soluble silicone oil also reduces the friction between the stylus and the disk groove.

It is also possible to employ the agent according to the invention in the form of a spray. To do this, the preparation is introduced into spray cans, and an aerosol propellant which has been liquified under pressure is added in amounts of up to 50% by weight, preferably 5 to 35% by weight. Examples of suitable propellants are FKW 12 (dichloro-difluoromethane) or FKW 114 [tetrafluorodichloroethane (or dichlorotetrafluoroethane)]. A mixture of FKW 114 and FKW 12 is particularly suitable. Small amounts (up to about 5%) of a compressed propellant gas, such as $CO_2$ or $N_2O$, can also be used.

Preferably, the agent according to the invention does not contain any further non-volatile compounds, such as, for example, surfactants or fluorinated surfactants. Despite very low contents of non-volatile active substance, this agent conducts electrostatic charge away from the disk in an outstanding manner, removes extraneous substances very readily from the disk surface and from the disk grooves, has an anti-adhesive effect and therefore substantially reduces further soiling, and decreases friction between the stylus and the plate groove, with the result that the usefulness of the disk remains unimpaired for a substantially longer time.

This is surprising, since, according to European Pat. No. 8,209, the components wax, surfactant and fluorinated surfactant are regarded as being indispensible for a satisfactory action.

The invention is illustrated in more detail by the examples which follow:

EXAMPLE 1

New disks of the same manufacture were used, some remaining untreated and some being sprayed with a disk care product and then wiped five times with a polyester velvet cloth. The electrostatic charge was then measured using the sensor of an "Eltostat" field strength meter, the sensor being 25 mm away from the disk. The experiments were repeated after 36 hours. The following field strengths were determined:

| Experiment | Agent | Field strength |
|---|---|---|
| a | none | 200–450 /KV/m |
| b | prior art* | 0.5–2.5 |
| c | according to the invention | 0.5–1 |

*commercially available product

The agent employed in experiment c had the following composition:
56% of FKW 113
15% of FKW 12
15% of FKW 114
0.035% of silicone oil L 03 (Wacker)
remainder ethanol (96% pure)

In experiment 1 b, a recognized commercial agent for disk cleaning and disk care was employed.

EXAMPLE 2

Cigarette ash was rubbed onto new disks of the same manufacture. The disk care products of Examples 1 b and 1 c were then sprayed on.

The agent according to Example 1 b combined with the ash to give an intimate greasy mixture was virtually impossible to remove. Even after the mixture had been wiped off with a velvet cloth, residues of ash were visible on the disk.

When the agent according to the invention, from Example 1 c, was employed, the ash was completely dissolved away from the grooves. The surface of the disk corresponding to the state of the new disk.

We claim:

1. A homogeneous, single phase liquid, wax-free phonograph record care product which is free of fluorinated surfactant and which consists essentially of:
   0.0001–5% by weight of a fluid, water-soluble polydimethylsiloxane-polyoxyalkylene copolymer;
   at least 40% by weight of trichlorotrifluoroethane;
   5–40% by weight of an aliphatic alcohol having 1 to 3 carbon atoms;
   and up to 10% by weight of water.

2. A product as claimed in claim 1, wherein said product contains at least 50% by weight of 1,1,2-trichloro-1,2,2-trifluoroethane.

3. A product as claimed in claim 1, wherein the aliphatic alcohol is ethanol.

4. A product as claimed in claim 1, wherein the amount of said aliphatic alcohol is 10 to 20% by weight.

5. A product as claimed in claim 1, wherein the weight ratio of water to alcohol in said product is in the range of 0.2 or less.

6. A product as claimed in claim 1, wherein said product is free of any surfactant.

7. An aerosol spray can-packaged phonograph record care product, wherein the aerosol spray can contains said product and an effective amount, up to 50% by weight of the contents of the can, of an aerosol propellant which has been liquified under pressure, said product being free of surfactants and consisting essentially of the composition of claim 1.

8. An aerosol spray can-packaged phonograph record care product according to claim 7 said product consisting essentially of:
   0.0001–5% by weight of a fluid water-soluble siloxane-glycol copolymer;
   at least 40% by weight of trichlorotrifluoroethane;
   5–35% by weight of an aerosol propellent; and
   from at least 5% up to 20% by weight of an aliphatic alcohol having from 1 to 3 carbon atoms, the weight ratio of any water present in the composition to the aliphatic alcohol content being not more than 0.2.

9. An aerosol spray can-packaged phonograph record care product as claimed in claim 8, wherein the amount of said aliphatic alcohol is 10 to 20% by weight.

10. An aerosol spray can-packaged phonograph record care product as claimed in claim 7, wherein the composition contains less than 95% by weight of trichlorotrifluoroethane.

11. An aerosol spray can-packaged phonograph record care product as claimed in claim 7, wherein said aerosol propellant is dichlorodifluoromethane, tetrafluorodichloroethane, $CO_2$, $N_2O$, or mixtures thereof.

12. A method of phonograph record care comprising the step of applying the product of claim 1 to a surface of the phonograph record.

13. A method of phonograph record care comprising the step of spraying a surface of the phonograph record with the aerosol spray can-packaged phonograph record care product of claim 7.

14. A method of phonograph record care comprising the step of spraying a surface of the phonograph record with the aerosol spray can-packaged phonograph record care product of claim 8.

* * * * *